(No Model.)
F. J. SMITH.
HINGE.
No. 493,190. Patented Mar. 7, 1893.
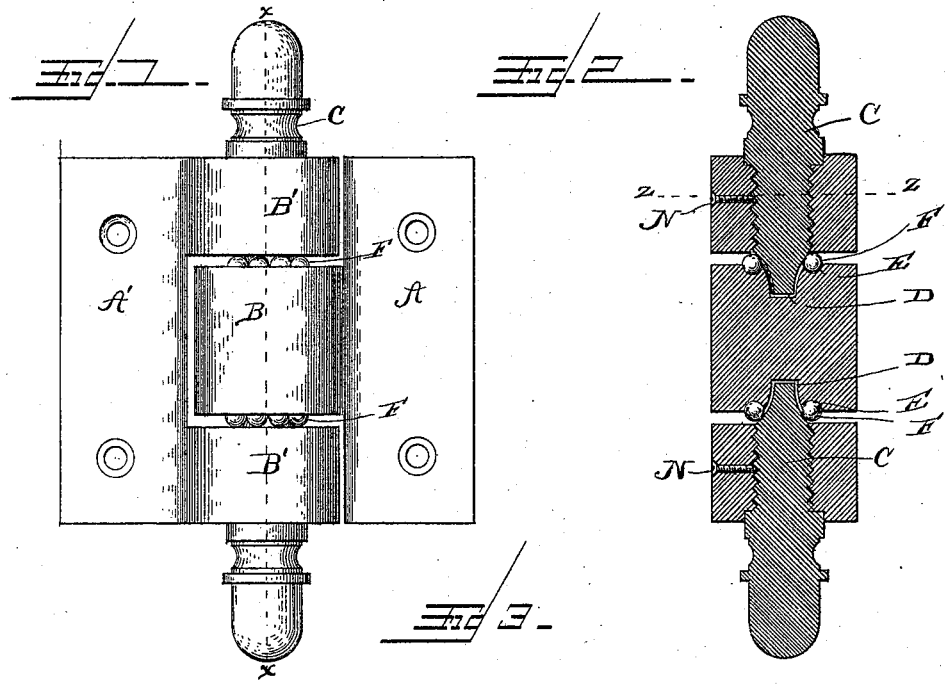
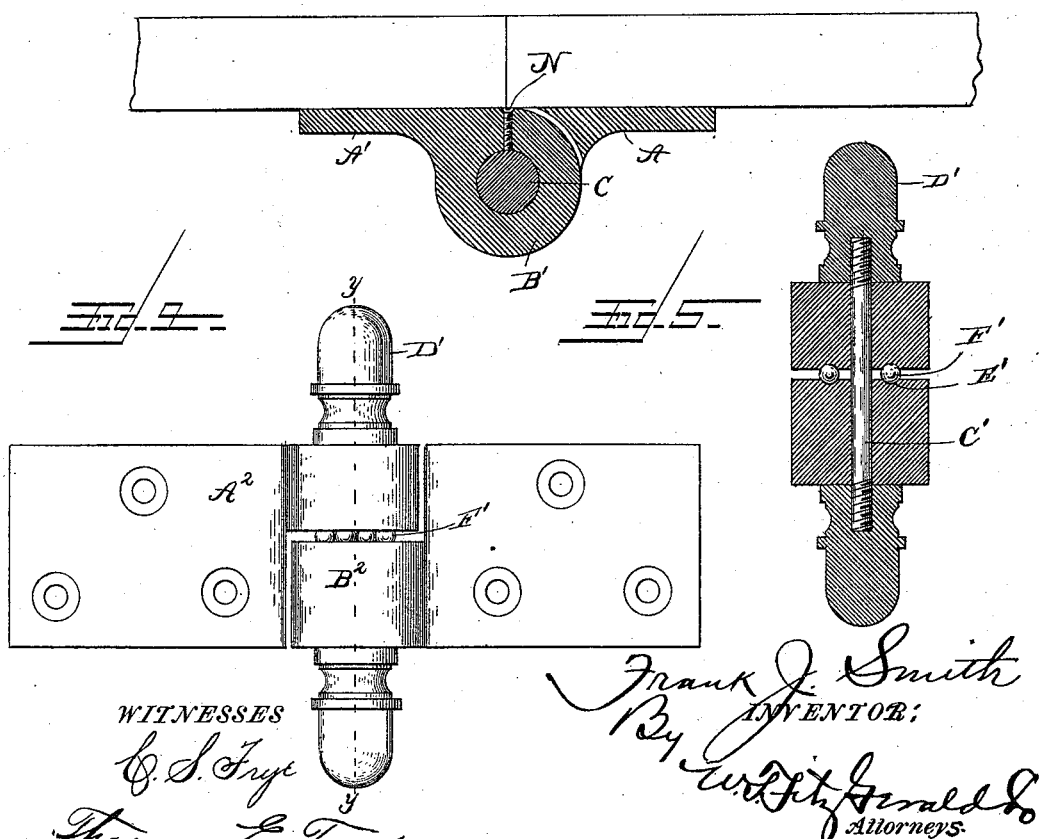
WITNESSES
C. S. Frye
Thomas E. Turpen
Frank J. Smith
INVENTOR
By W. Fitzgerald
Attorneys

UNITED STATES PATENT OFFICE.

FRANK. J. SMITH, OF MUSKEGON, MICHIGAN.

HINGE.

SPECIFICATION forming part of Letters Patent No. 493,190, dated March 7, 1893.

Application filed April 22, 1892. Serial No. 430,251. (No model.)

*To all whom it may concern:*

Be it known that I, FRANK. J. SMITH, a citizen of the United States, residing at Muskegon, in the county of Muskegon and State of Michigan, have invented certain new and useful Improvements in Door-Hinges; and I do hereby declare the following to be a full, clear, and exact description of the invention, such as will enable others skilled in the art to which it appertains to make and use the same.

My invention has relation to improvements in door hinges, its general object being to reduce friction between the parts of the hinge so that the same will work more easily and be less liable to frictional wear.

To the attainment of the foregoing and other objects, the invention consists in the peculiar construction, certain novel combinations and the adaptation of parts hereinafter described and particularly pointed out in the claim appended.

In the accompanying drawings:—Figure 1 is an elevation of my improved hinge. Fig. 2 is a vertical, transverse section of the same taken in the plane indicated by the line $x$—$x$ on Fig. 1. Fig. 3 is a horizontal section of the hinge taken in the plane indicated by the line $z$—$z$ on Fig. 2, illustrating the manner of applying the hinge to a door jamb and door.
Fig. 4 is an elevation of a modified construction of my improved hinge; and: Fig. 5 is a vertical, transverse section taken in the plane indicated by the line $y$—$y$ of Fig. 3.

Referring by letter to the said drawings and more particularly to Figs. 1, 2 and 3, thereof: A, indicates one of the wing sections of my improved hinge, which is provided with a bearing block B, as illustrated, and A', indicates the other wing section which is provided with two sleeves B', which straddle the bearing block B, and are provided with interior threads, as shown, for a purpose presently disclosed.

Formed in the center of the ends of the bearing block B, are depressions D, which are preferably of the form shown and are designed and adapted to receive the inner tapered ends of the pivot bolts C, which are threaded, as shown, so as to engage the threads of the sleeves B', of the wing section A'.

Formed in the ends of the bearing block B, are circular ways or grooves E, in which are placed the friction balls F, which bear against the inner tapered ends of the bolts C, and serve to reduce friction between the bearing block and said bolts and consequently between the said bearing block and the sleeves of the wing section A', to render the movement of one section with respect to the other more easy. By reason of the friction balls F, bearing against the inner tapered ends of the bolts C, as shown, it will be perceived that in order to compensate for friction wear it is simply necessary to tighten the said bolts C.

Taking through radially disposed threaded apertures formed in the sleeves B', of the wing section A', at about the point illustrated in Fig. 3, are screws N, which are designed and adapted to bind upon the bolts C, and lock the same against turning. By reason of the placement of these screws, as shown, it will be readily perceived that they can only be removed and the bolts C, adjusted or removed, when the door is open, which is a highly important desideratum.

In Figs. 4 and 5 of the drawings I have illustrated a modified construction of hinge in which a single ball bearing is employed between the wing sections, as shown. Referring to the said Figs. 4 and 5: $A^2$, indicates the wing sections of my improved hinge which are preferably of a rectangular form, as shown, and are provided at their inner ends with sleeves $B^2$, designed to rest one above the other and receive the pivot bolt C'. This pivot bolt C', has its ends threaded, as illustrated, to receive the cap nuts D', which serve to hold the wing sections in position. Formed in the contiguous ends of the sleeves $B^2$, of the wing sections $A^2$, are circular ways or grooves E', which are preferably of a curvilinear form in cross-section and are designed to receive and permit play of a number of friction balls F', which serve in practice to reduce friction between the said sleeves $B^2$, and render the movement of the wing sections $A^2$, more easy.

By reason of the construction hereinbefore described and disclosed in the annexed drawings, it will be perceived that my improved hinge is especially adapted for hanging heavy doors, such as safe doors, since one of the wing sections will move freely with respect to the other.

Although I have specifically described the construction and relative arrangement of the several elements of my improved hinge, yet I do not desire to be confined to the same, as such changes or modifications may be made as fairly fall within the scope of my invention.

Having thus described my invention, what I claim, and desire to secure by Letters Patent, is—

In a hinge the combination with a wing section having a bearing block with central depressions and circular grooves surrounding the same: of a wing section having interiorly threaded sleeves straddling the bearing block, adjustable bolts passing through said sleeves and having tapering ends to connect with said depressions, friction balls seated in the grooves and bearing against the tapered ends of the bolts, and means as described for connecting said bolts and sleeves together, substantially as and for the purposes specified.

In testimony whereof I affix my signature in presence of two witnesses.

FRANK. J. SMITH.

Witnesses:
J. A. McCARTHY,
JOHN LOGGERS.